United States Patent [19]

Kojima et al.

[11] 4,145,577
[45] Mar. 20, 1979

[54] RINGING CONTROL APPARATUS

[75] Inventors: Takafumi Kojima, Yokohama; Tatsuru Miyoshi, Fujisawa; Takuji Mukaemachi, Yokohama, all of Japan

[73] Assignee: Hitachi, Ltd., Japan

[21] Appl. No.: 828,671

[22] Filed: Aug. 29, 1977

[30] Foreign Application Priority Data

Aug. 30, 1976 [JP] Japan .............................. 51-102667

[51] Int. Cl.$^2$ ........................................... H04M 3/04
[52] U.S. Cl. ............................. 179/18 HB; 179/84 R
[58] Field of Search ............ 179/84 R, 84 A, 18 HB, 179/18 F, 18 FA, 17 E

[56] References Cited

U.S. PATENT DOCUMENTS 3,551,604  12/1970  Joel ................................ 179/18 HB

OTHER PUBLICATIONS

IBM Technical Disclosure Bulletin, vol. 12, No. 11, Apr. 1970, pp. 1759-1761, "Ringing System for Telephone Lines".
IBM Technical Disclosure Bulletin, vol. 12, No. 11, Apr. 1970, pp. 1736-1737, Garcia, J., "Ringing System for Telephone Lines".

Primary Examiner—William C. Cooper
Assistant Examiner—Joseph A. Popek
Attorney, Agent, or Firm—Craig & Antonelli

[57] ABSTRACT

A ringing control apparatus comprises a bidirectional switching circuit connected in series to a ringing source, which generates an alternating current of a large amplitude, for delivering to a called subscriber the AC signal as an interrupted ringing signal, a phase detector circuit in the form of a zero level detector for detecting the phase of the AC signal generated from the ringing source, and a control circuit for generating a signal for turning on and off the switching circuit in synchronism with the output signal of the phase detector circuit. The delivery of the ringing to the called subscriber is started at a point of time when the ringing voltage comes to a zero level and is stopped at a point of time when the ringing current comes to a zero level, thereby to prevent generation of a surge voltage.

8 Claims, 4 Drawing Figures

RINGING CONTROL APPARATUS

LIST OF PRIOR ART REFERENCE (37 CFR 1.56 (a))

The following references are cited to show the state of the art:
1. Japanese Patent Laid-Open No. 50-104508
2. Japanese Patent Laid-Open No. 51-75309
3. IBM Technical Disclosure Bulletin Vol. 12, No. 11, April 1970, pp. 1736–1737, entitled "Ringing System for Telephone Lines", written by J. Garcia.

BACKGROUND OF THE INVENTION

1. FIELD OF THE INVENTION

This invention relates to an apparatus for delivering a ringing signal to a called subscriber, or more in particular to a ringing control apparatus used with a telephone exchange for controlling the start and stoppage of the delivery of a ringing signal to a called subscriber.

2. DESCRIPTION OF THE PRIOR ART

An example of the conventional control system 10 for controlling a ringing signal to be sent to a called subscriber will be described below with reference to FIGS. 1 and 2. A circuit diagram associated with the delivery of a ringing signal to a called subscriber from a ringing trunk is shown in FIG. 1, and the waveform of a signal generated in that circuit is shown in FIG. 2.

In FIG. 1, reference numeral 1 designates a telephone of a called subscriber, numeral 2 a channel network for transmitting a signal, numeral 3 a ringing trip detector circuit, numeral 4 a ringing device, and numeral 5 a continuous ringing source in the form of an AC oscillator of AC 75 $V_{RMS}$ having a frequency of 16.6 Hz. Numeral 6 designates an interrupt relay for generating, through contacts 7 thereof, an interrupted ringing signal of one second on and two seconds off, from the continuous ringing signal. The ringing device 4 is provided in common on the exchange. The interrupted ringing signal of one second on and two seconds off which is produced by the ringing device 4 is delivered to a called subscriber. When a ringing signal is delivered to the called subscriber 1, a connection loop as shown in FIG. 1, starting from ground through continuous ringing source 5, contact 7, ringing trip detector circuit 3, channel network 2, called subscriber's telephone 1, channel network 2, and power supply, back to ground, is formed by the control apparatus. As long as the called subscriber is on hook, an interrupted ringing signal of one second on and two seconds off is delivered to the called subscriber 1 in asynchronism with the phase of the AC signal from the continuous ringing source 5 by means of the interrupted relay 6. When the called subscriber 1 responds to the ringing, the response is detected by the ringing trip detector circuit 3 so that the delivery of the ringing signal is stopped in asynchronism with the phase of the ringing. The delivery of the ringing is also stopped in asynchronism with the phase of the ringing when the called subscriber 1 gives up the call on the way.

As explained above, the conventional control systems are such that when the delivery or stoppage of a ringing signal to a called subscriber is effected, the ringing signal of high voltage and large current from the ringing source 5 is interrupted in asynchronism with its phase. As shown in FIG. 2, therefore, a sudden voltage change of +120 V or −120 V may occur at the beginning of the delivery of the ringing signal. Also, when stopping the delivery of the ringing signal, the current in the bell coil of the telephone set of the called subscriber is suddenly cut off. As a result, the energy accumulated in the coil may present itself as a surge voltage with a peak value of high voltage. This surge voltage of large value is applied to the channel network 2, thereby causing an erroneous actuation of the channel network due to a high voltage exceeding the breakdown voltage.

A channel network using integrated semiconductor switching elements has come to be used in recent years. The ability of the integrated semiconductor switching elements to withstand a surge voltage is lower as compared with that of the mechanical contacts of the conventional crossover switch, and such elements are apt to be erroneously actuated by a high-level surge voltage having a pulse width of several to several tens of $\mu s$ which is generated instantaneously.

In order to produce an integrated semiconductor switching element having a high breakdown voltage of more than several hundred volts which can withstand such a surge voltage, it is necessary to widen the intervals between elements. This leads to lower integration, resulting in offsetting the advantages of economical efficiency, compactness and light weight.

SUMMARY OF THE INVENTION

An object of the present invention is to provide a ringing control apparatus which can prevent a surge voltage of large value from being generated at the time of start or stoppage of the delivery of a ringing signal.

Another object of the invention is to provide a ringing control apparatus which is economical and simple in construction and does not adversely affect the integrated semiconductor switching elements.

According to the present invention, there is provided a ringing control apparatus comprising a bidirectional switching circuit connected in series with a ringing source for delivering to a called subscriber an AC signal in the form of an interrupted signal, a phase detector circuit providing zero level detection for detecting the phase of the AC signal generated from the ringing source, and a control circuit for generating a signal for operating the switching circuit in synchronism with the output signal of the phase detector circuit.

DETAILED DESCRIPTION OF THE PREFERRED EMBODIMENTS

Figure 1:
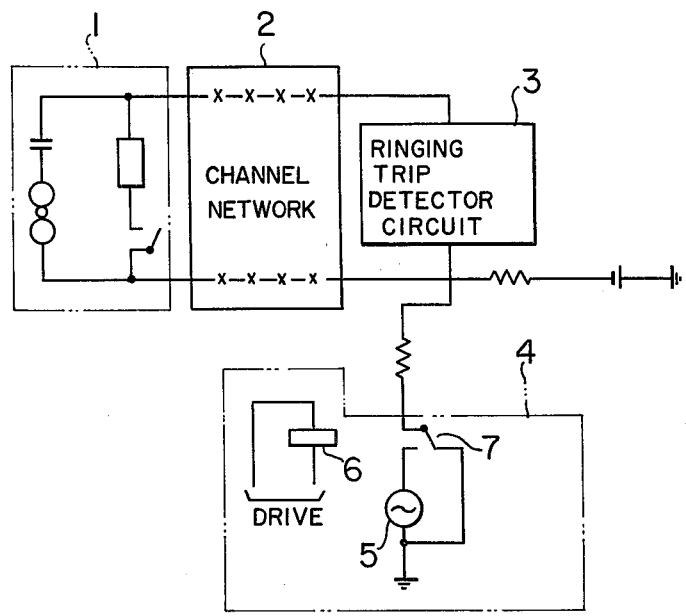
FIGS. 1 and 2 are circuit and waveform diagrams respectively for explaining a conventional called subscriber ringing control apparatus.
Figure 2:
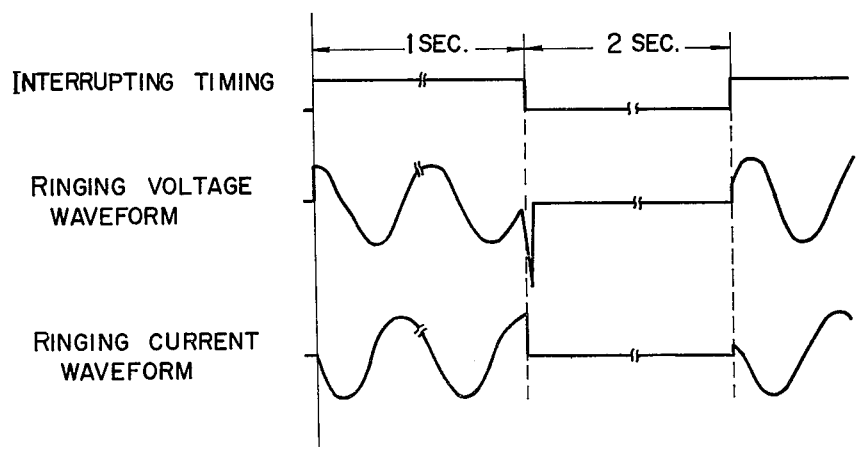
Figure 3:
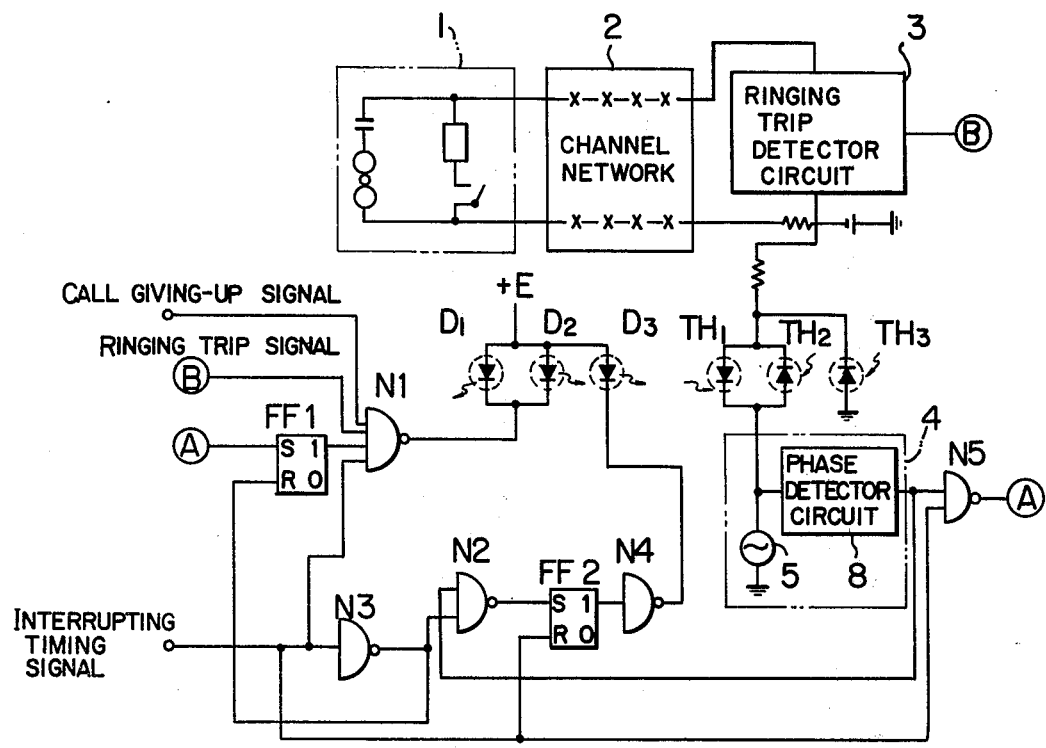
FIG. 3 is a circuit diagram showing an embodiment of the called subscriber ringing control apparatus according to the present invention.

The circuit diagram of FIG. 3 shows an embodiment of the ringing control apparatus according to the present invention. In this drawings, reference numerals 1 to 5 designate like component elements as in FIG. 1, and numeral 8 a phase detector circuit for detecting the phase of the AC signal generated from the continuous ringing source 5. When the ringing voltage changes from a negative polarity to a positive polarity, a logic "1" signal is produced at the output terminal of the circuit 8. The phase detector circuit 8 is of the type commonly referred to as a "zero level detector" and is so well-known that it will not be described in detail here. Reference characters $D_1$, $D_2$ and $D_3$ designate light-emitting diodes, and $TH_1$, $TH_2$ and $TH_3$ light-receiving thyristors. The light-emitting diodes $D_1$, $D_2$ and $D_3$ are respectively optically coupled with the thyristors $TH_1$, $TH_2$ and $TH_3$. The thyristors $TH_1$ and $TH_2$ make up a bidirectional switching circuit for delivering an AC signal in the form of an interrupted signal to a called subscriber. Characters $FF_1$ and $FF_2$ designate flip-flops, character S a set terminal of the flip-flops and R a reset terminal thereof. Upon application of a logic "0" signal to the set terminal S, the flip-flops are set, with the result that the output 1 is converted into "1" and the output 0 into "0". Characters $N_1$, $N_2$, $N_3$, $N_4$ and $N_5$ are NAND circuits. The flip-flops $FF_1$ and $FF_2$, NAND circuits $N_1$, $N_2$, $N_3$, $N_4$ and $N_5$, and light-emitting diodes $D_1$, $D_2$ and $D_3$ make up a control circuit for generating a signal for operating the thyristors $TH_1$ and $TH_2$ of the switching circuit in synchronism with the output signal of the phase detector circuit 8. The switching circuit and the control circuit are located in each ringing trunk. The reason for this is that the phase difference between the voltage and current of the ringing signal is determined by the capacity and inductance within the telephone set of the called subscriber and the line capacity, and therefore in order to accurately cut off the apparatus at zero level of ringing current according to the object of the invention, the functions of the present invention are required for each ringing trunk connected for each called subscriber. The operation of the apparatus according to the invention will be described below with reference to FIGS. 3 and 4.

An interrupting timing signal of one second on and two seconds off for producing an interrupted ringing signal from the continuous ringing signal and the output signal from the phase detector circuit 8 are distributed to the control circuit within each ringing trunk from the ringing device 4 or another device not shown in the drawings.

First, explanation will be made of the case of normal operation where a ringing signal begins to be delivered. Assume that an order transmit a ringing signal to the called subscriber 1 is issued to the NAND circuits $N_1$, $N_3$ and $N_5$ within the control circuit from the device generating the interrupting timing signal, with the interrupting timing shown in FIG. 4. At this point in time, the NAND conditions of the NAND circuit $N_1$ are not yet satisfied since flip-flop $FF_1$ is reset, so that no current flows in the light-emitting diodes $D_1$ and $D_2$, and the corresponding light-sensitive thyristors $TH_1$ and $TH_2$ are in the off state. When the ringing generated from the ringing source 5 changes from a negative polarity to a positive polarity, the output terminal of the phase detector circuit 8 detects the zero crossing and produces a "1" pulse. Since one of the input terminals of the NAND circuit $N_5$ is already supplied with an interrupting timing signal to be at the "1" level, the NAND conditions of the NAND circuit $N_5$ are satisfied and the flip-flop $FF_1$ is set, thereby making the output 1 thereof "1" in state. The input to the NAND circuit $N_1$ carrying the signal for giving up a call on the way is at the "1" level because of normal operation, and the input carrying the signal for ringing trip is also "1" in level since the called subscriber has not yet responded. Further, the input carrying the signal for interrupting timing is also "1" in level since the interrupting timing signal of one second on is being received. As a result, the NAND conditions of the NAND circuit $N_1$ are satisfied the very instant the ringing voltage generated from the ringing source changes from negative polarity to a positive polarity. Current flows in the diodes $D_1$ and $D_2$, so that a gate current is supplied to the thyristors $TH_1$ and $TH_2$ thereby to turn on the light-sensitive thyristors $TH_1$ and $TH_2$. In view of the fact that the thyristors $TH_1$ and $TH_2$ are turned on only as the ringing voltage changes from negative polarity to a positive polarity, no high voltage is abruptly applied to the channel network 2 but instead an AC signal increasing slowly from zero level is provided. The ringing signal flows through the thyristors $TH_2$ and $TH_1$ respectively during the positive and negative half cycles of the ringing operation.

The operation of transfer from one-second delivery of the ringing signal to two-second cut-off will be explained below.

Figure 4:
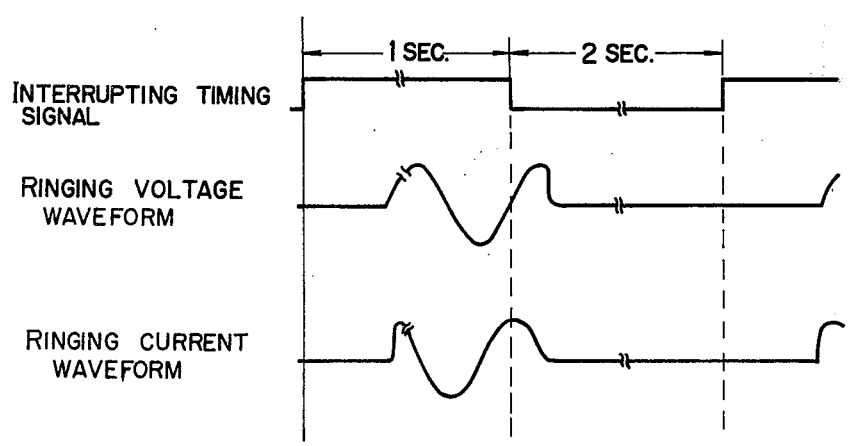
FIG. 4 is a waveform diagram for explaining the operation of the circuit diagram of FIG. 3.

After one second, the interrupting timing signal changes to "0" level and the NAND conditions of the NAND circuit $N_1$ fail to be met, with the result that no current flows in the diode $D_1$ or $D_2$, thereby terminating the gate drive of the corresponding thyristors $TH_1$ and $TH_2$. Due to the holding characteristics of the thyristors the thyristors are held on when the current is more than the holding current even if the gate drive is stopped, and they are turned off only after the current is reduced below the holding current, however, the ringing continues to be transmitted even after the interrupting timing signal becomes "0" level as shown in FIG. 4. At the point in time when the ringing current reaches zero, the thyristor $TH_2$ is turned off. Since the thyristor $TH_2$ is turned off at the time when the ringing current is reduced to zero, a large surge voltage which otherwise might be caused due to the inductance within the telephone set is prevented. Because of the phase difference between the voltage and current of the ringing signal, the turn off at zero current is liable to cause an abrupt voltage change. Actually, however, the current fails to lead the voltage as much as 90° but leads only by about 60°, and therefore the actual voltage change is about 80 volts. In order to detect the response by the called subscriber at the time of signal turn-off, on the other hand, the thyristor $TH_3$ is required to be turned on to form a loop after turning off the thyristors $TH_1$ and $TH_2$. The NAND circuits $N_3$, $N_2$ and $N_4$ and flip-flop $FF_2$ are logic elements for controlling the thyristor $TH_3$. In other words, when the interrupting timing signal becomes "0" in level and the ringing voltage changes from a negative polarity to a positive polarity so that the output signal of the phase detector circuit 8 becomes "1" in logic level, the NAND conditions of the NAND circuit $N_2$ are satisfied and the output of the NAND circuit $N_4$ becomes zero in level. As a result, current flows into the light-emitting diode $D_3$, thereby turning on the light-sensitive thyristor $TH_3$.

In the case of giving up a call in the interim or ringing trip, the input signals (for giving up a call in the interim) (or for ringing trip) of the NAND circuit $N_1$ become zero, respectively. Thus, the NAND conditions of th NAND circuit $N_1$ fail to be satisfied, so that a current stops flowing into the diodes $D_1$ and $D_2$. As explained above, the thyristors $TH_1$ and $TH_2$ are turned off when the current flowing therein becomes zero by the stoppage of the gate current thereof. It will be understood from the foregoing description that the subscriber ringing control apparatus according to the present invention presents a high surge voltage from being generated at the time of initial delivery or stoppage of the ringing signal, and therefore makes possible a superior electronic telephone exchange system without adversely affecting the advantages of the integrated semiconductor switching elements.

The aforementioned embodiments refer to the case where light-sensitive thyristors are connected in reverse parallel to each other as a switching circuit for converting the AC signal generated by the ringing source 5 into an interrupted ringing. As such a switching circuit, it is of course possible to employ alternatively a semiconductor switching element of PNPN four-layer structure with the same current-holding characteristics. Such a switching element may be controlled in transformer coupling with the control circuit. The described embodiments also refer to the case where the delivery of the ringing is stopped at zero level of the ringing by the current-holding characteristics of the thyristors or the like. If the zero ringing current from the ringing source is detected by the phase detector circuit to open the switching circuit, no switching element of current-holding type is obviously required in the switching circuit.

We claim:

1. A ringing control apparatus for applying a ringing signal to a called subscriber's circuit comprising:
   a signal source for generating an AC signal;
   a bidirectional switching circuit connected to said signal source for converting said AC signal into an interrupted ringing signal to be delivered to said called subscriber's circuit;
   a phase detector circuit connected to said signal source for producing an output signal at a predetermined level of said AC signal; and
   a control circuit connected to said phase detector circuit for turning on and off said switching circuit only in synchronism with an applied interrupting timing signal and said output signal of said phase detector circuit.

2. A ringing control apparatus according to claim 1, wherein said phase detector circuit transmits an output signal when the voltage of said AC signal generated from said signal source reaches a zero level.

3. A ringing control apparatus according to claim 1, wherein said switching circuit includes a self-holding semiconductor switching element with a PNPN four-layer structure and said semiconductor switching element has a self-holding characteristic of stopping the delivery of a ringing signal at a zero level of the ringing signal current.

4. A ringing control apparatus according to claim 3, wherein said self-holding semiconductor switching element with a PNPN four-layer structure is a light-sensitive thyristor, and said control circuit includes a light-emitting diode corresponding to said light-sensitive thyristor.

5. A ringing control apparatus according to claim 3, wherein said self-holding semiconductor switching element with a PNPN four-layer structure forms a thyristor which is coupled with said control circuit through a transformer.

6. A ringing control apparatus according to claim 4, wherein said light-emitting diode is connected to an output terminal of a NAND circuit which has an input terminal supplied with a call-giving-up signal and a ringing trip signal from a subscriber.

7. A ringing control apparatus comprising:
   (a) a ringing source for generating a ringing AC signal;
   (b) a bidirectional switching circuit connected in series between said ringing source and a called subscriber's circuit and selectively interrupting delivery of said AC signal to said called subscriber's circuit;
   (c) a first detector circuit connected to said ringing source for generating an output signal in response to detection of substantially zero level of said AC signal; and
   (d) first control means supplied with an interrupting timing signal having a first and a second level alternately and periodically which corresponds to periods of delivering said AC ringing signal to said subscriber's circuit and stopping the delivery of said AC ringing signal to said subscriber's circuit, respectively, turning on said bidirectional switching circuit in response to the logical product of said output signal from said first detector circuit and the first level of said interrupting timing signal, and turning off said bidirectional switching circuit in response to the logical product of said output signal from said first detector circuit and the second level of said interrupting timing signal.

8. A ringing control apparatus according to claim 7, further comprising:
   a ringing trip detector circuit connected to said called subscriber's circuit and generating an output signal in response to detection of ringing trip of said called subscriber's circuit;
   a second switching circuit connected in series to a DC current loop constituted by a series circuit of said ringing trip detector circuit and a DC power source, and selectively switching said DC current loop on and off;
   second control means for turning on said second switching circuit in response to the logical product of the output signal from said first detector circuit and said second level of said interrupting timing signal, and then for turning off said second switching circuit in response to the logical product of the output signal from said first detector circuit and said first level of said interrupting timing signal; and
   means for turning off said bidirectional switching circuit in response to the output signal from said ringing trip detector circuit.

* * * * *